(12) United States Patent
Rozen et al.

(10) Patent No.: US 9,141,753 B2
(45) Date of Patent: Sep. 22, 2015

(54) METHOD FOR PLACING OPERATIONAL CELLS IN A SEMICONDUCTOR DEVICE

(75) Inventors: Anton Rozen, Gedera (IL); Asher Berkovitz, Kiryat Ono (IL); Michael Priel, Netanya (IL)

(73) Assignee: Freescale Semiconductor, Inc., Austin, TX (US)

( * ) Notice: Subject to any disclaimer, the term of this patent is extended or adjusted under 35 U.S.C. 154(b) by 11 days.

(21) Appl. No.: 14/358,736

(22) PCT Filed: Dec. 1, 2011

(86) PCT No.: PCT/IB2011/055417
§ 371 (c)(1),
(2), (4) Date: May 16, 2014

(87) PCT Pub. No.: WO2013/079995
PCT Pub. Date: Jun. 6, 2013

(65) Prior Publication Data
US 2014/0351781 A1 Nov. 27, 2014

(51) Int. Cl.
*G06F 17/50* (2006.01)
(52) U.S. Cl.
CPC ........ *G06F 17/5081* (2013.01); *G06F 17/5072* (2013.01); *G06F 2217/78* (2013.01); *G06F 2217/84* (2013.01); *Y02E 60/76* (2013.01); *Y04S 40/22* (2013.01)
(58) Field of Classification Search
CPC ............ G06F 17/5068; G06F 17/5072; G06F 17/5031; G06F 2217/78; G06F 17/5081; G06F 2217/84; Y02E 60/76; Y04S 40/22
See application file for complete search history.

(56) References Cited

U.S. PATENT DOCUMENTS

| | | | |
|---|---|---|---|
| 7,698,677 B2 | 4/2010 | Zhao et al. | |
| 7,882,464 B1 | 2/2011 | Rochel et al. | |
| 8,327,305 B1* | 12/2012 | Hooi et al. | 716/124 |
| 2003/0212973 A1* | 11/2003 | Lin et al. | 716/6 |
| 2004/0049752 A1 | 3/2004 | Iwanishi et al. | |
| 2007/0094630 A1 | 4/2007 | Bhooshan | |
| 2007/0245285 A1 | 10/2007 | Wang et al. | |
| 2008/0141202 A1* | 6/2008 | Matsumura et al. | 716/8 |
| 2009/0125858 A1 | 5/2009 | Vishweshwara et al. | |

OTHER PUBLICATIONS

"Dynamic Voltage (IR) Drop Analysis and Design Closure: Issue and Challenges", by Nithin S K, Gowrysankar Shanmugam, Sreeram Chandrasekar, @2010 IEEE.*

(Continued)

*Primary Examiner* — Nha Nguyen

(57) ABSTRACT

There is provided a method of placing a plurality of operational cells of a semiconductor device within a semiconductor layout, comprising determining timing data for each of the plurality of operational cells, determining switching activity from RTL or design constraints for each of the plurality of operational cells, determining power grid switch locations relative to each of the plurality of operational cells, deriving a cost function based upon the determined timing data, determined switching activity from RTL/design constraints and determined relative power grid switch locations and initially placing the plurality of operational cells according to the derived cost function.

19 Claims, 9 Drawing Sheets

(56) References Cited

OTHER PUBLICATIONS

International Search Report Written Opinion correlating to PCT/IB2011/055417 dated Apr. 4, 2012.

Chuang et al.; "Voltage-drop aware analytical placement by global power spreading for mixed-size circuit designs" IEEE/ACM International Conference on Computer-Aided Design Digest of Technical Papers; Nov. 2-5, 2009; pp. 666-673.

* cited by examiner

METHOD FOR PLACING OPERATIONAL CELLS IN A SEMICONDUCTOR DEVICE

FIELD OF THE INVENTION

This invention relates to methods for initially placing and re-placing operational cells of a semiconductor device within a semiconductor physical layout.

BACKGROUND OF THE INVENTION

As semiconductor devices have developed, there has been a move towards creating semiconductor devices with lower supply voltages, yet higher operational currents (so called low-voltage, high-current designs). In such designs, one of the significant causes of power loss/waste (i.e. power dissipated as heat, rather than contributing to the processing capability of the semiconductor) is from the so called "IR drop".

IR drop is typically caused by the losses resultant from the resistive portion (R) of the active parts of a semiconductor's impedance interacting with the currents (I) flowing through those active portions of the semiconductor device, according to Ohms law. In actual fact, the dissipated power losses are related to the square of the current, according to the equation Power loss=$I^2R$. Active portions of a semiconductor device may be defined by those currently enabled/powered up, and receiving a clock or other switching signal.

SUMMARY OF THE INVENTION

The present invention provides a method of initially placing a plurality of operational cells of a semiconductor device within a semiconductor physical layout as described in the accompanying claims.

There is also provided a method of re-placing a plurality of operational cells of a semiconductor device within a semiconductor physical layout as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

Figure 1:
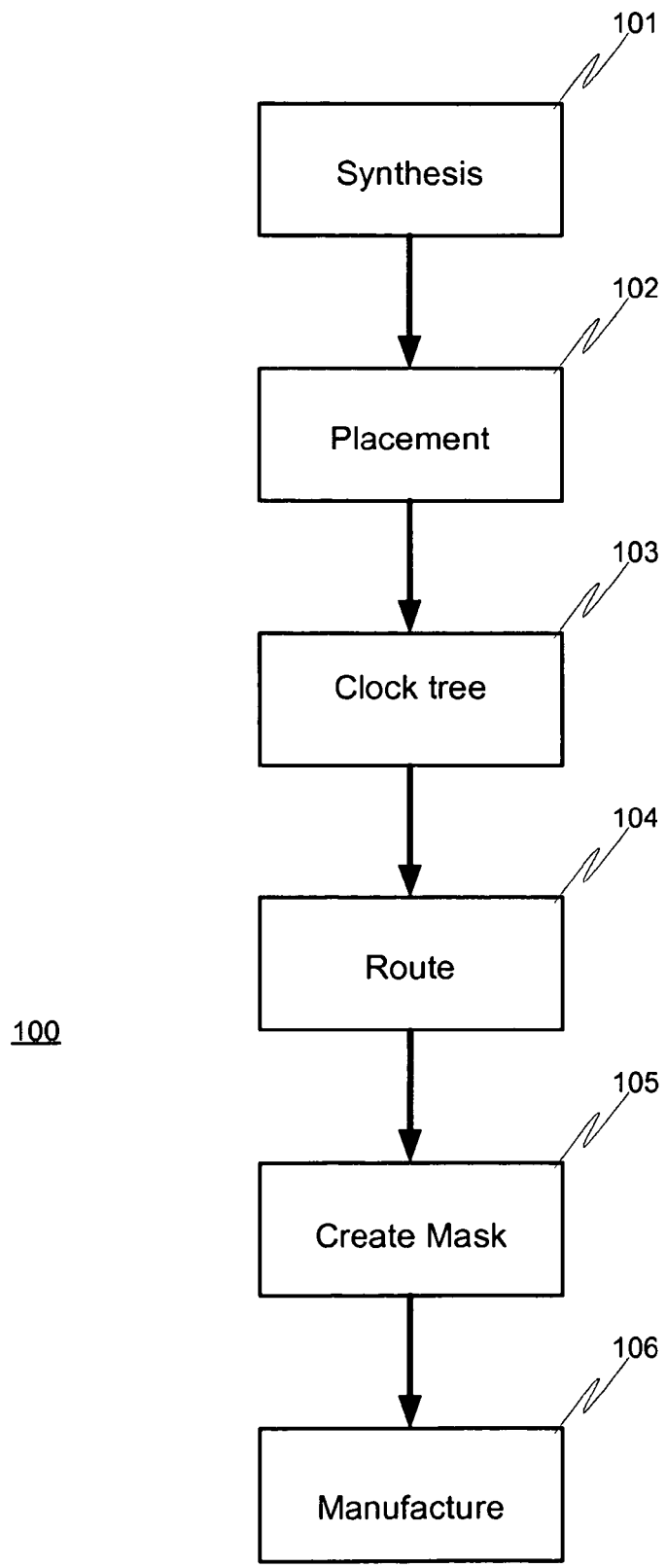
FIG. 1 shows a flow chart of an example semiconductor design flow process for converting a functional description of a semiconductor design into a semiconductor physical layout.

FIG. 1 shows a flow chart of an example semiconductor design flow process 100 for converting a functional description (i.e. logic description, e.g. RTL) of semiconductor design into a semiconductor physical layout, from which one or more masks may be produced, for use in manufacturing a semiconductor device according to the semiconductor design. The semiconductor design flow process 100 may comprise an initial circuit synthesis stage 101, to create a listing of functional operational cells used to form the semiconductor device from the functional description of semiconductor design, a placement stage 102, where the operational cells from the synthesis stage are placed in an initial physical semiconductor layout, a clock tree propagation stage 103, where the physically placed operational cells forming the semiconductor device are connected to the clock signal tree, and a routing stage 104, where the other signal interconnections are physically routed between the physical locations of the different operational cells within the semiconductor physical layout.

Figure 9:
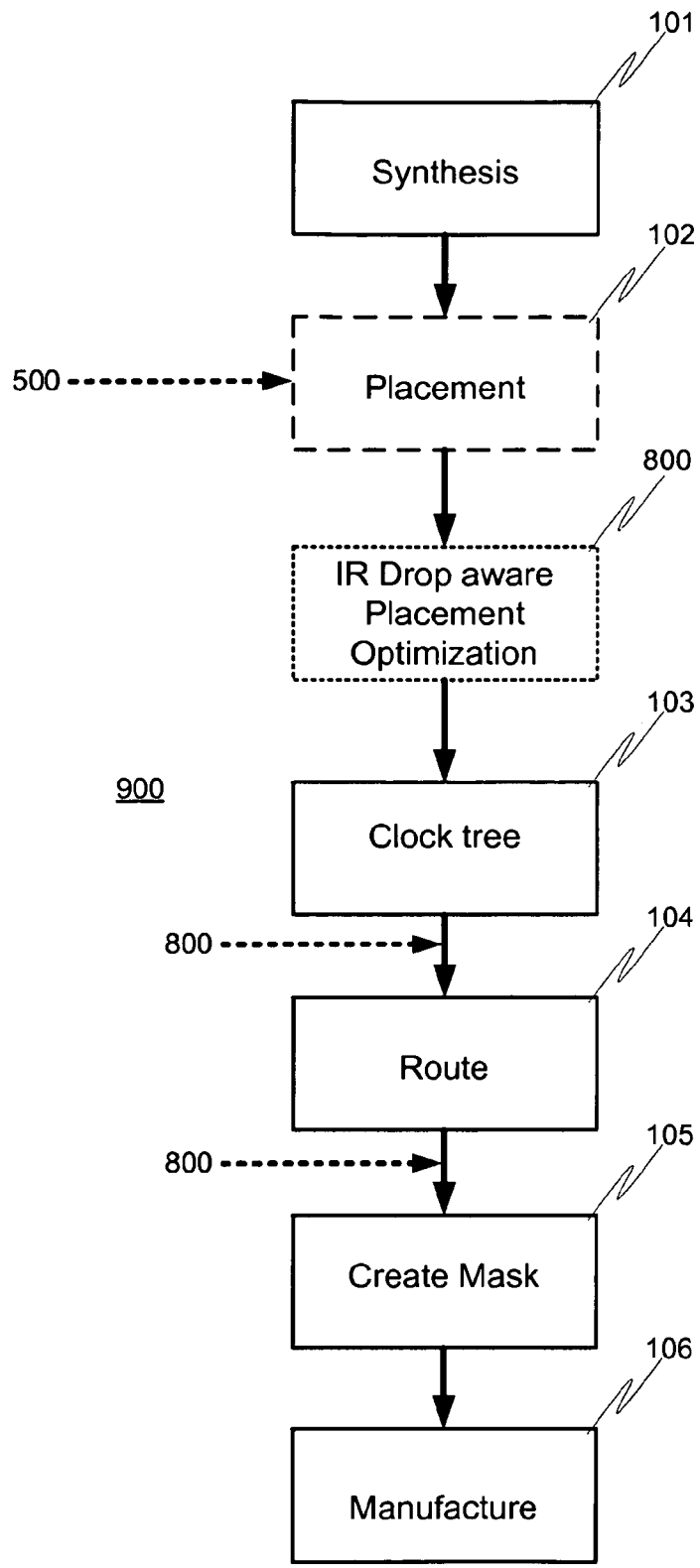
FIG. 9 shows a flow chart of a semiconductor design flow process for converting a functional description of a semiconductor design into a semiconductor physical layout, according to an example of the invention.

Once the semiconductor physical layout is finalised, one or more physical layout masks may be created 105 from the semiconductor physical layout, on a layer by layer basis, which can then be used in a typical planar semiconductor manufacturing/fabrication process 106 (using the masks on photo-resist covered substrate, etching and the like) to form the different layers (e.g. doped silicon layers, metallisation, etc.) of the semiconductor design. The process may form part of an Electronic Design Automation (EDA) system for designing semiconductor devices. The described example methods alter the above-described semiconductor design and manufacture flow process, and may be embodied as an integrated EDA system, such as shown in FIG. 9.

Figure 2:
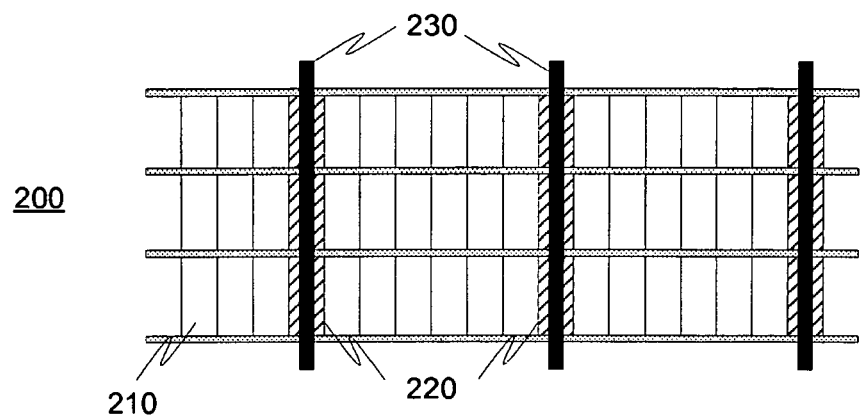
FIG. 2 schematically shows an example of a portion of a semiconductor device having operational cells operably coupled to a distributed power grid arrangement.

FIG. 2 schematically shows an example of a portion 200 of a semiconductor device layout, having a plurality of operational cells 210 operably coupled to a power grid arrangement comprising, for example, distributed power switches 220 coupled to power supply conductors 230. If the semiconductor device is of a planar construction on a semiconductor substrate (as shown), the conductors 230 may be, for example, power grid strips formed from metal, or another suitable conductor material, overlaying the semiconductor formations. The distributed switches 220 may be pre-placed over the semiconductor layout area, prior to the placement of the operational cells 210 themselves, and connected to the strip conductors 230 to form a power grid arrangement.

The power grid arrangement provides power to each of the operational cells 210 of the semiconductor device, where each operational cell 210 is a functional sub unit of the overall semiconductor device. The operational cell may, for example, be a standard cell or a group of semiconductor device (e.g. transistor) functions and interconnects that provide a logic function or a storage function. Operational cells 210 may be formed of any suitable circuitry or computer logic, and the invention is not limited to any particular form of operational cell type. Examples of the types of operational cell include, but are not limited to: Boolean logic cells (such as OR, AND, NAND, XOR, etc.), flip-flop cells, and the like.

The power grid arrangement may support low power design features, such as power gating, i.e. where the power to a particular portion of the semiconductor device may be switched off when that particular portion is not required by the present computational load on the semiconductor device. In this way, large portions of a semiconductor device may be turned off and hence save power. Other power saving techniques may also be applied. A power gating technique may use a switchable power grid arrangement, and in the case of supplying power to a multicore Central Processing Unit (CPU), per-core power switching may be provided also.

Whilst FIG. 2 shows the switchable power grid arrangement formed from distributed switches 220, which are often used due to board technology limitations, the switchable power grid arrangement may also be implemented, for example, by a centralized power switch (not shown).

Once the arrangement of the power grid is finished, the placement of the different operational cells 210 making up the particular semiconductor device may be carried out. However, the placement of the power grid components, such as distributed power switches 220 and the like may also be carried out at the same time, or even after, the placement of the operational cells 210. The placement of the operational cells 210 may comprise converting a suitable semiconductor design in a language, such as Register-Transfer Level (RTL) code and any other suitable data such as timing data (e.g. skew data) and design layout constraint data, that represents the operation (e.g. the flow of signals or data in an integrated circuit) of the intended semiconductor device, into a workable physical design layout using either automatic or manual conversion of the relevant code/data into suitable operational cells 210 and their respective locations on the semiconductor physical layout relative to one another and the power grid arrangement.

Skew is a variation in the intended timing of switching of the respective operational cell, for example an AND gate. Skew can be caused by many different things, such as wire-interconnect length, temperature variations, variation in intermediate devices, capacitive coupling, material imperfections, and differences in input capacitance on the inputs of operational cells, compared to the output capacitance of another operational cell providing the input signal. As the clock rate of a circuit increases, timing skew becomes more critical and less variation can be tolerated if the circuit is to function properly. There are two types of skew: negative skew and positive skew. Examples of the methods described herein apply to both types of skew.

During conversion to a semiconductor physical layout design, the conversion technique used may apply one or more rule sets to the semiconductor physical layout that controls where the respective operational cells 210 are placed relative to one another. For example, operational cells 210 may be locally grouped together when they are part of the same timing-critical path, or logically related registers may be placed near one another to reduce power consumption.

Once a placement for all the operational cells 210 of a semiconductor device has been completed, the proposed completed semiconductor physical layout may be tested in simulation to see how the particular semiconductor physical layout will operate during use of the semiconductor device.

Figure 3:
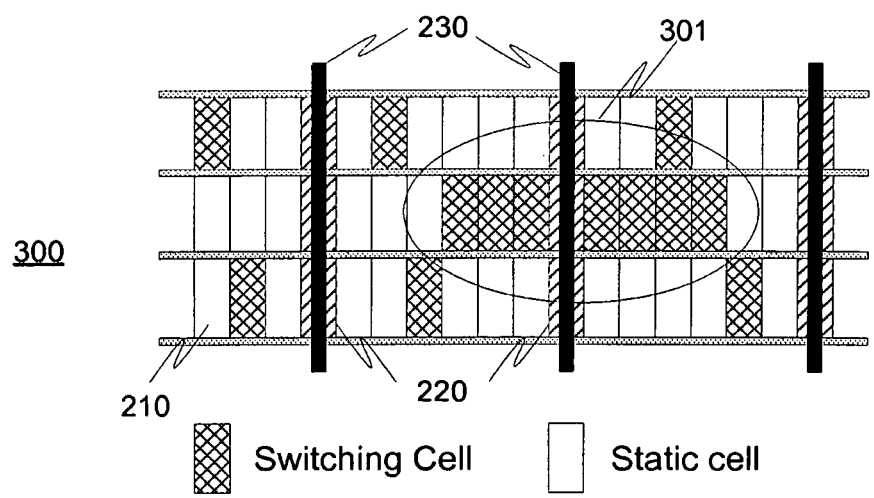
FIG. 3 schematically shows the example portion of the semiconductor device of FIG. 1, during use, illustrating how a localised area of relatively high IR drop may occur in a portion of the semiconductor device.

FIG. 3 schematically shows the example portion 200 of the semiconductor device of FIG. 2 during a simulation 300, illustrating how a localised area of relatively high IR drop 301 may occur in a portion of the semiconductor device during use.

IR drop occurs in operational cells due to the resistive loss, caused by the operational current passing through resistive portions of the operational cell 210. It is at least partially caused by the switching of the particular operational cell 210, due to the clock or other switching signal. Therefore, where a particular semiconductor operational cell physical layout results in locally grouped operational cells 210 participating in the same critical path (as indicated with group 301 in FIG. 3) that are switching simultaneously, a very high IR drop takes place, and timing of such a critical path can degrade significantly. These locally grouped, simultaneously switching, operational cells may be referred to as a switching island.

In this case, the importance of limited-area statistics for the IR drop and timing in operational cells with inter-dependent activity is much higher than a global statistic for IR drop and timing. For example, the operational cells 210 in the same group 301 may see a local simultaneous switching rate of 75%, even when the overall global rate is only approximately 25%. Distributed power switch schemes may use precision considerations, because in distributed power switch schemes, each local "small" distributed power switch may be "responsible" for only the operational cells/modules in its own local neighbourhood, while in global common power switch schemes, the common power switch may be responsible for all the operational cells/modules grid power requirements based on global statistics.

This local vs global switching rate difference is a problem that may be aggravated by some Back End (BE) synthesis tool techniques that place timing/route related operational cells 210 near each other. Furthermore, power saving techniques, such as "register clumping", which place logically related registers near each other, can also aggravate the IR drop problems.

Figure 4:
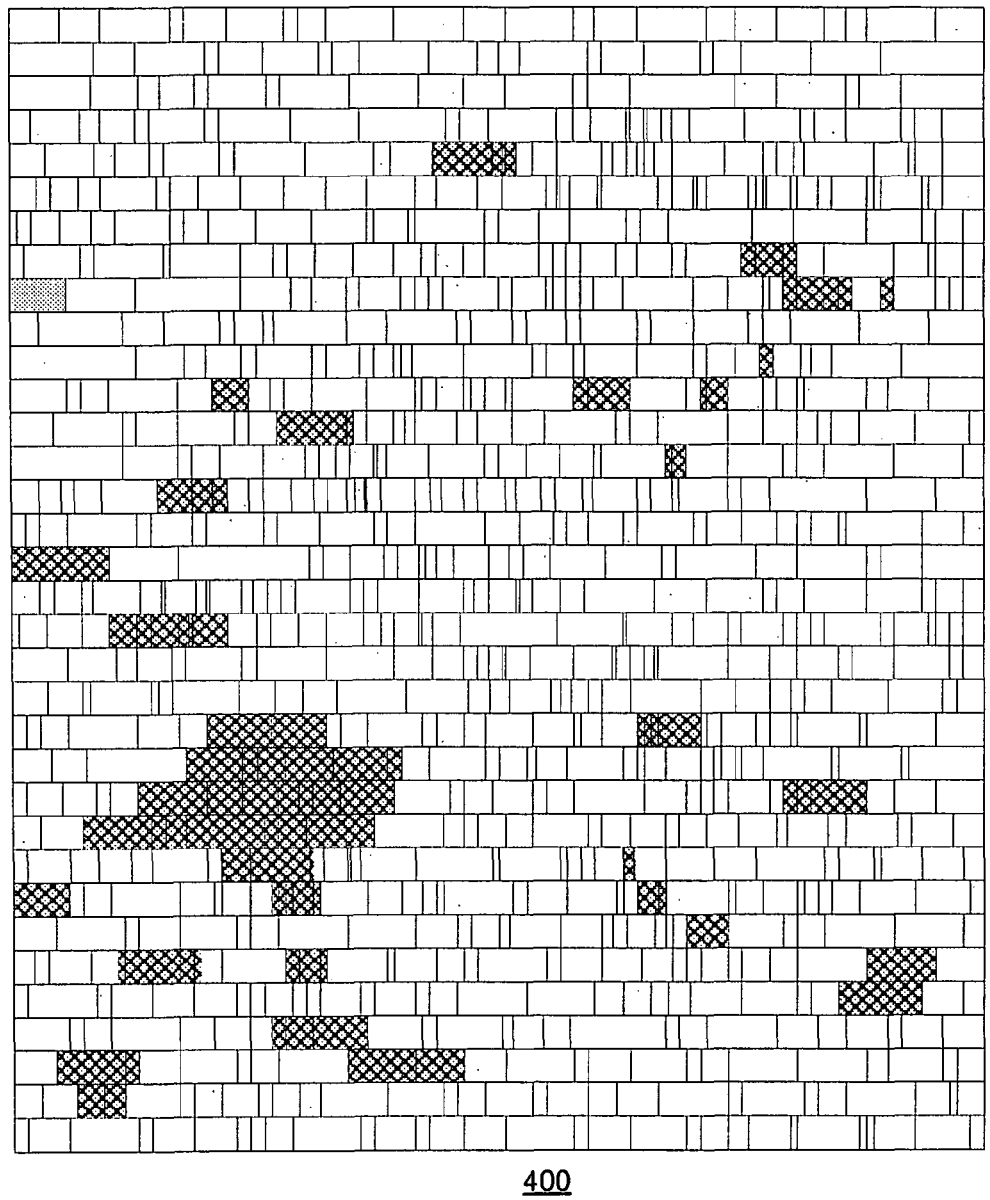
FIG. 4 shows a more detailed example of a real-life semiconductor design in which localised IR drop issues have occurred.

A larger scale example 400 for such grouped and simultaneously switching operational cells 210 can be seen in FIG. 4. In this figure, the problematic "switching islands", i.e. groups of operational cells 210 that are located near one another and which switch at substantially the same time, and hence have greater than expected IR drop (when compared to the global IR drop values) may include simultaneously switched operational cells 210 that contain either clock buffers or standard logic operational cells.

A method of placing operational cells 210 in a semiconductor physical layout design, or re-placing operational cells 210 within a pre-existing physical layout (i.e. design) is provided, in which an operational cell 210 initial placement is produced, evaluated, and then a post-placement optimization is carried out that takes into account: the operational cells 210 involvement in timing-critical paths; the distance between operational cells 210 of same switching group; and the distance(s) between operational cells 110 of the same switching group and the power grid switch connection(s) locations.

In particular, there is provided a method of initially placing a plurality of operational cells of a semiconductor device within a semiconductor physical layout, comprising determining timing data for each of the plurality of operational cells, determining switching activity from RTL or design constraints for each of the plurality of operational cells, determining power grid switch locations relative to each of the plurality of operational cells, deriving a cost function based upon the determined timing data, switching activity and power grid switch locations, and initially placing the plurality of operational cells at positions which are dependent on the derived cost function.

There is also provided a method of re-placing a plurality of operational cells of a semiconductor device within a semiconductor physical layout, comprising determining a simulated IR drop value for each of the plurality of operational cells when the semiconductor device will be in use, identifying operational cells having a simulated IR drop value above a predetermined threshold, and determining whether the identified operational cells have a high estimated IR due to simultaneous switching. If it is determined that the IR drop is due to simultaneous switching, then the method further comprises determining timing data (such as skew) for each of the plurality of operational cells, determining switching activity from RTL or design constraints for each of the plurality of operational cells, determining power grid switch locations relative to each of the plurality of operational cells, deriving a cost function based upon the determined timing data, switching activity and power grid switch locations, and re-placing identified operational cells within the semiconductor layout to reduce IR drop. Once the operational cells of the semiconductor physical layout (i.e. design) are re-placed, the method further comprises (re) determining a simulated IR drop value for each of the plurality of re-placed operational cells when the semiconductor device will be in use, and determining whether each re-placed operational cell IR drop value is below a predetermined maximum IR drop threshold.

Switching activity is a metric defined per instance (i.e. an instance of an operational cell), and may be equal to the amount of clock cycles in which the output of the instance toggles, divided by the total number of cycles in a given timing period. It may also be known as switching probability, or activity ratio. Other definitions of switching activity may also be used in the described methods.

The method may be carried out iteratively, i.e. using the initial placement method described first, then one or more iterations of the re-placement method described above. Some iterations may temporally cause an increase in IR drop for certain ones of the operational cells in a single iteration, as a result of the interactions between the different re-placements of the operational cells. However, the described method(s), when used for a suitable number of iterations for a given use-case, may result in lower overall IR drop.

The methods may ignore any high IR drop on non-critical timing paths, because there may be a sufficiently high timing margin to obviate the need to re-place the operational cells 210 on those particular timing paths. In this respect, a critical timing path is the path between an input and output with the maximum delay. Furthermore, operational cells may be regarded as being in the same switching group if, for example, they are part of the same critical path. When cells in critical path experience IR drop, their delay is increased, and semiconductor operational timing may be violated. Accordingly, because the described methods reduced localised IR drop, the delay is reduced and the semiconductor can maintain any relevant timing constraints. Power usage of the resultant semiconductor may also be reduced.

The switching inter-dependence of the operational cells 210 may be observed/estimated by using test vectors, and/or design constraints or the RTL code, and the inter-dependence may be assessed locally, between neighbouring operational cells 210, or more generally between operational cells 210 across the whole semiconductor design. The locality of the inter-dependence may also change as operational cells 210 are re-placed subsequently.

High IR-drop cells that are locally grouped in an initial semiconductor physical layout (design) may be treated in the following ways. Switching islands identified with high IR drop (i.e. where the IR drop is above a predetermined threshold value, typically called the IR drop limit) may be determined during the semiconductor device design process, and may be ungrouped by moving selected "problematic" operational cells from the switching island to elsewhere, for example by:

swapping out a switching island operational cell with another operational cell 210 not in the same simultaneous switching island grouping; or swapping out a switching island operational cell with another operational cell 210 that belongs to a less-critical timing path within the semiconductor device.

The swapping out may be carried out locally (i.e. the swap occurs between operational cells within a predetermined distance of one another in the physical layout) where there are timing/skew and/or routing constraints, or the swapping out may be un-limited with respect to distances between the respective operational cells, where there are no issues of timing and route constraints, (i.e. a faraway location in the physical layout may be considered in these cases).

Thus, a simultaneously switching-dependent and IR drop-aware placement method for a semiconductor device formed from operational cells 210 can be obtained, in which operational cell (inteil/re-)placement optimization for IR-drop considers operational cell inter-dependent switching activity. This method may provide a power grid fix for IR drop issues that is less costly (in terms of computational processing level required and time taken) than previous methods. Furthermore, the disclosed method enables more flexible, "loose" constraints for the power grid, i.e. where there are less routing resources dedicated to the power grid, e.g. less metal power lines.

Figure 5:
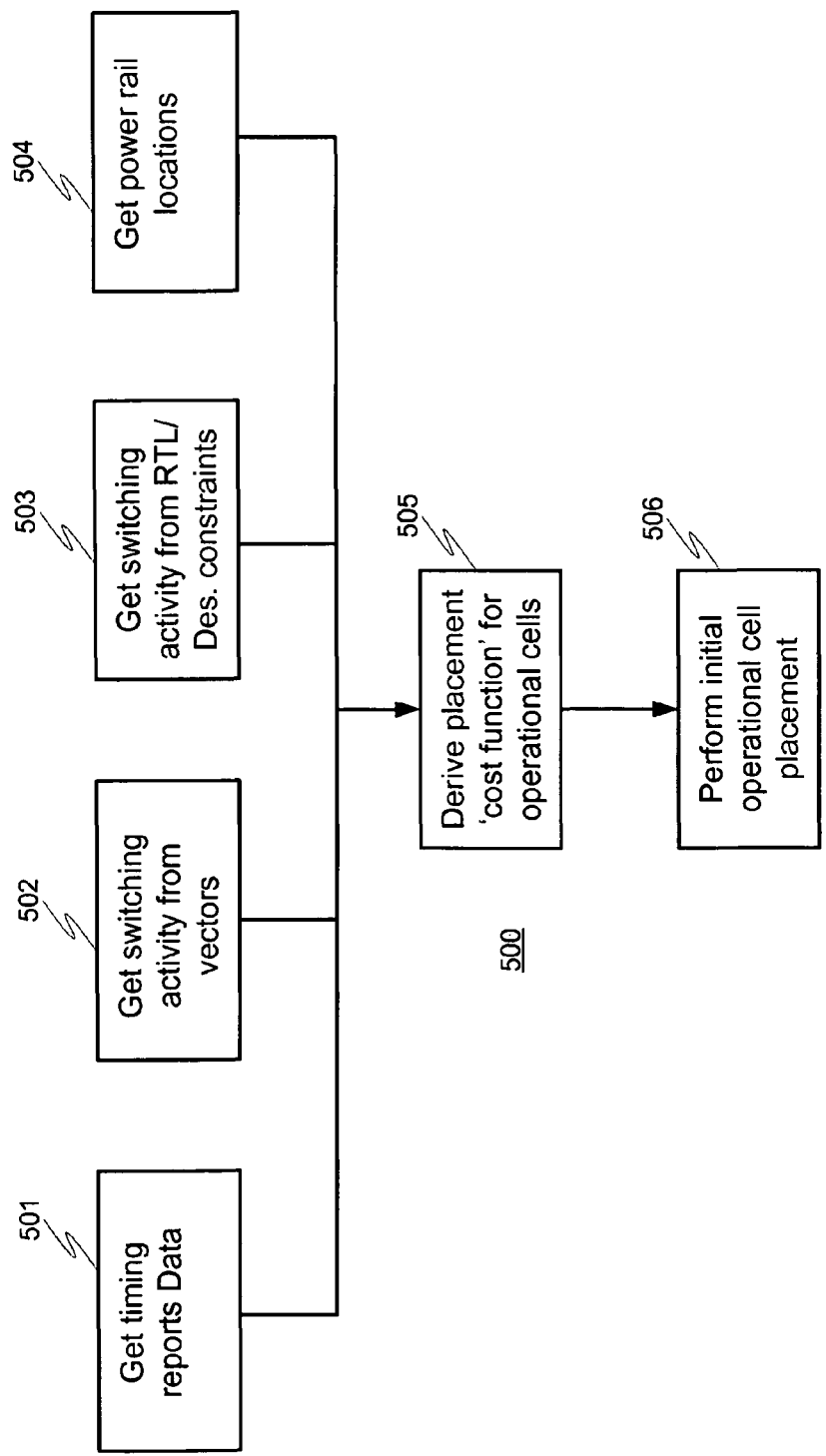
FIG. 5 shows a high level flow diagram of a method for initially placing operational cells within a semiconductor physical layout, according to an example of the invention.

The flowchart of FIG. 5 shows in more detail a method for initially placing operational cells 210 of a semiconductor device 500, according to an example of the invention.

The initial placement method comprises determining timing (e.g. skew) data 501 for each of the plurality of operational cells 210 forming the semiconductor device from timing data reports, determining switching activity from test vectors 502 for each of the plurality of operational cells forming the semiconductor device, determining switching activity from RTL or design constraints 503 for each of the plurality of operational cells 210 forming the semiconductor device, and determining power grid switch locations 504 relative to each of the plurality of operational cells 210. A cost function may then be derived 505, based upon the determined skew data, determined switching activity from vectors and RTL/design constraints and determined relative power grid switch locations. The operational cells 210 of the semiconductor may then be initially placed dependent on the derived cost function 506.

Other factors may also be assessed before an initial placement layout is provided. Examples of the present invention notably uses timing (e.g. skew) data 501, switching data 503 and power rail location data 504 to determine an initial semiconductor physical layout for the operational cells 210 forming the semiconductor device.

The operational cell placement "cost function" 505 for each operational cell 210 used in the semiconductor device may be a cost value associated with each possible operational cell placement configuration. Typically, the initial layout and placement process seeks to place each operational cell 210 in a location that reduces the cost function to a minimum, which is indicative of an optimised layout, in consideration of all relevant data sets (501 to 504). However, there may be a trade-off between the optimal placement location(s) of different operational cells 210 given the different input data sets. The cost function may be determined based upon an area of interest, i.e. it is based upon values for operational cells within a defined/relevant area. The definition of the relevant defined area may be arbitrary to the use case.

Figure 6:
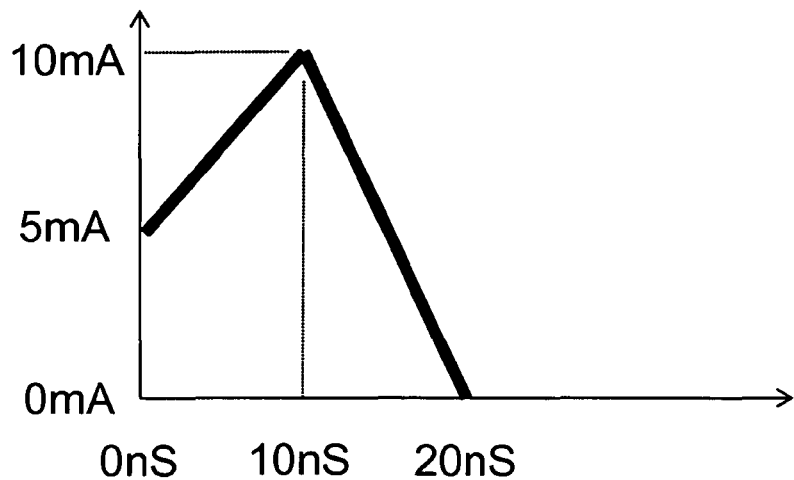
FIG. 6 shows an example representation of a PieceWise Linear (PWL) function that may be used to describe a linear waveform.

FIG. 6 shows an example representation of a PieceWise Linear (PWL) function that may be used to describe a linear waveform. PWL may be used to describe the time varying power waveform expected for an operational cell, for use in determining a cost function of the operational cell placement. The example shown in FIG. 6 may be represented textually in the form of 0 nS, 5 mA, 10 nS, 10 mA, 20 nS, 0 mA, which may be represented in short hand pairs as: 0.5, 10.10, 20.0. The shorthand form of the PWL signal representation is used in FIGS. 7a to 7e.

FIGS. 7a to 7e show a simplified example method of deriving a cost function for an operational cell according to an example of the invention, in which the relevant area is defined as the operational cell of interest and its two neighbours to the right and left only, when deriving the cost function for a respective one of the operational cells. The invention is not limited to this form of relevant area characterisation, and may instead use other forms of characterisation, for example referencing all operational cells surrounding the respective operational cell (i.e. referencing operational cells to the left, right, above and below), or any other suitable defined relevant area characterisation. The choice of relevant area may be made after an initial IR drop simulation run, to provide a suitable level of granularity to the relevant areas used for the IR drop assessments.

Figure 7A:
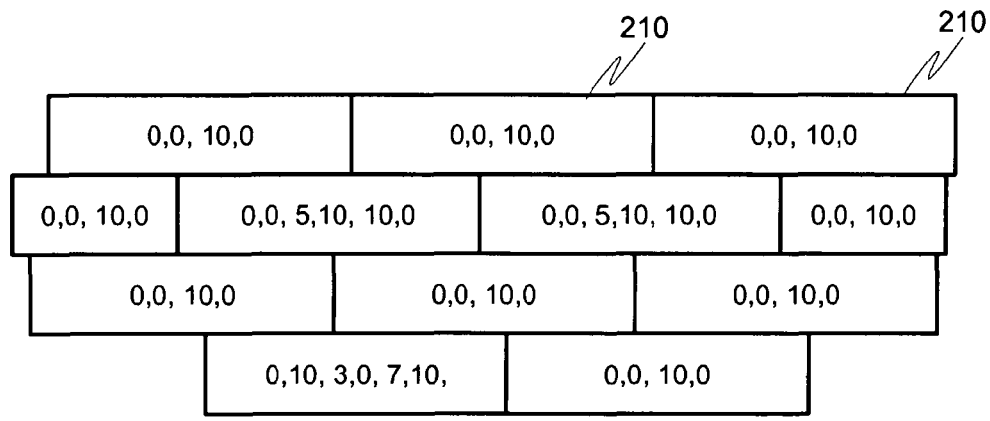
FIGS. 7*a* to 7*e* show a method of deriving a cost function for an operational cell according to an example of the invention.

FIG. 7a shows an example portion of a semiconductor physical layout showing the different operational cells 210 with their respective individual PWL representations, that may be calculated from a simulation of the operational cells function when used in the proposed semiconductor design, where each operational cell is a single physical instance of a predefined operational cell type (e.g. AND logic, OR logic, etc.). For simplicity, only two operational cells are shown having any time varying signals (i.e. having an IR drop).

Figure 7B:
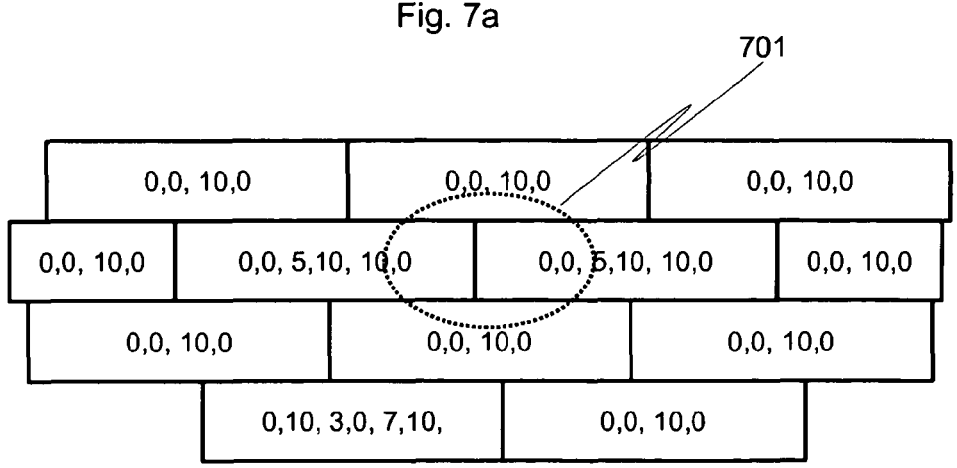

FIG. 7b shows the same example portion of the physical semiconductor layout, in which a local peak 701 current draw is highlighted, which in the example shown, is 10 mA at 5 nS, i.e. in this simplified example, the two operational cells will produce a peak current draw (and hence power draw, from $I^2R$) at 5 nS equaling 20 mA.

Figure 7C:
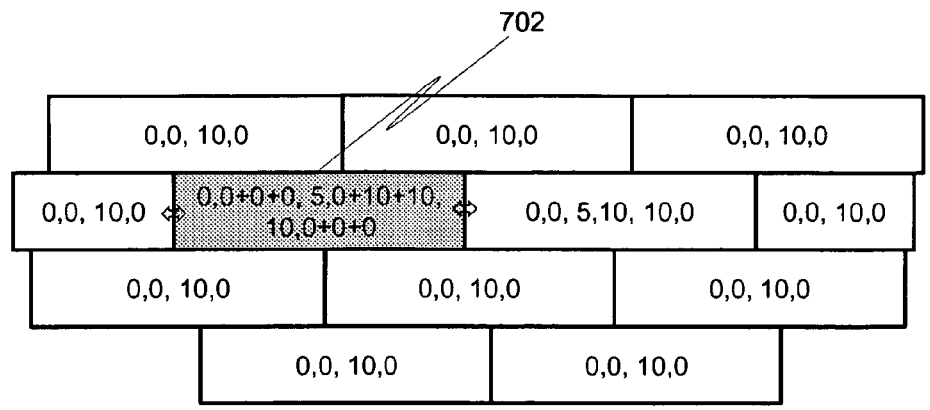

FIG. 7c shows an example of how the cost function of the highlighted operational cell 702 of interest may be calculated from the neighbouring operational cells. In the example shown, this may be done by adding the respective current values at each time instance (0 nS, 5 nS, 10 nS) from the operational cells to the left and right of the operational cell of interest, i.e. for the 5 nS point in time this includes adding the 0 mA value from the operational cell to the left of the operational cell of interest 702 and the 10 mA from the operational cell to the right of the operational cell of interest 702, to the original 10 mA value of the operational cell of interest 702. This process may be carried out for each operational cell in the initial semiconductor physical layout, and, where an iterative example of the process is used, for each intermediate iteration.

Figure 7D:
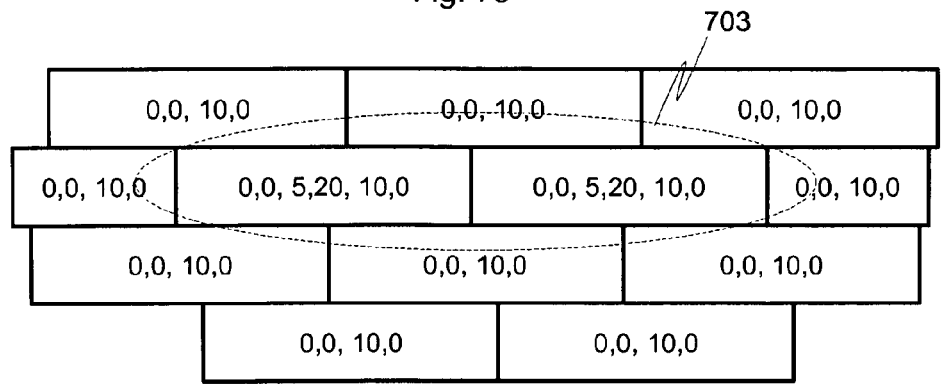

FIG. 7d shows the result of carrying out this example cost function calculation across the whole portion of the semiconductor physical layout. Once the peak current draws for each operational cell are known for a particular layout (i.e. the peak operational current draw(s) resultant from operation of the relevant area of the semiconductor device in its current physical layout form), they can be compared to a predefined threshold peak current value, to evaluate whether it is worthwhile moving the respective operational cell to reduce localised IR drop of the relevant area. For example, if a maximum peak IR drop threshold is set such that the maximum current draw is 9 mA, then in the example shown, it is worthwhile moving the respective operational cell. The choice of suitable maximum IR drop threshold value (from which a maximum peak current value can be derived) will depend on the use case, and may be set accordingly. The invention is not limited by the choice of suitable threshold peak current value used. In FIG. 7d, there is shown a high IR drop "switching island" in the middle 703.

Figure 7E:
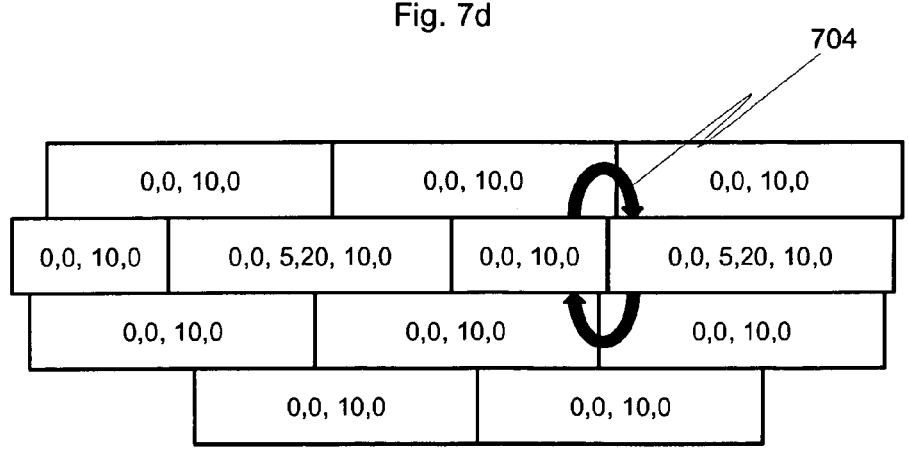

FIG. 7e shows how the "switching island" may be avoided by swapping around one of the high IR drop operational cells with a low IR drop neighbouring operational cell 704. In this example, the switch is between a smallest peak current nearest neighbour (which was to the right). In a more complex method, where there might be more than one option in respect of the smallest nearest neighbour, any suitable predefined method to select a one of a number of suitable candidates may be used, and the invention is not so limited.

Figure 8:
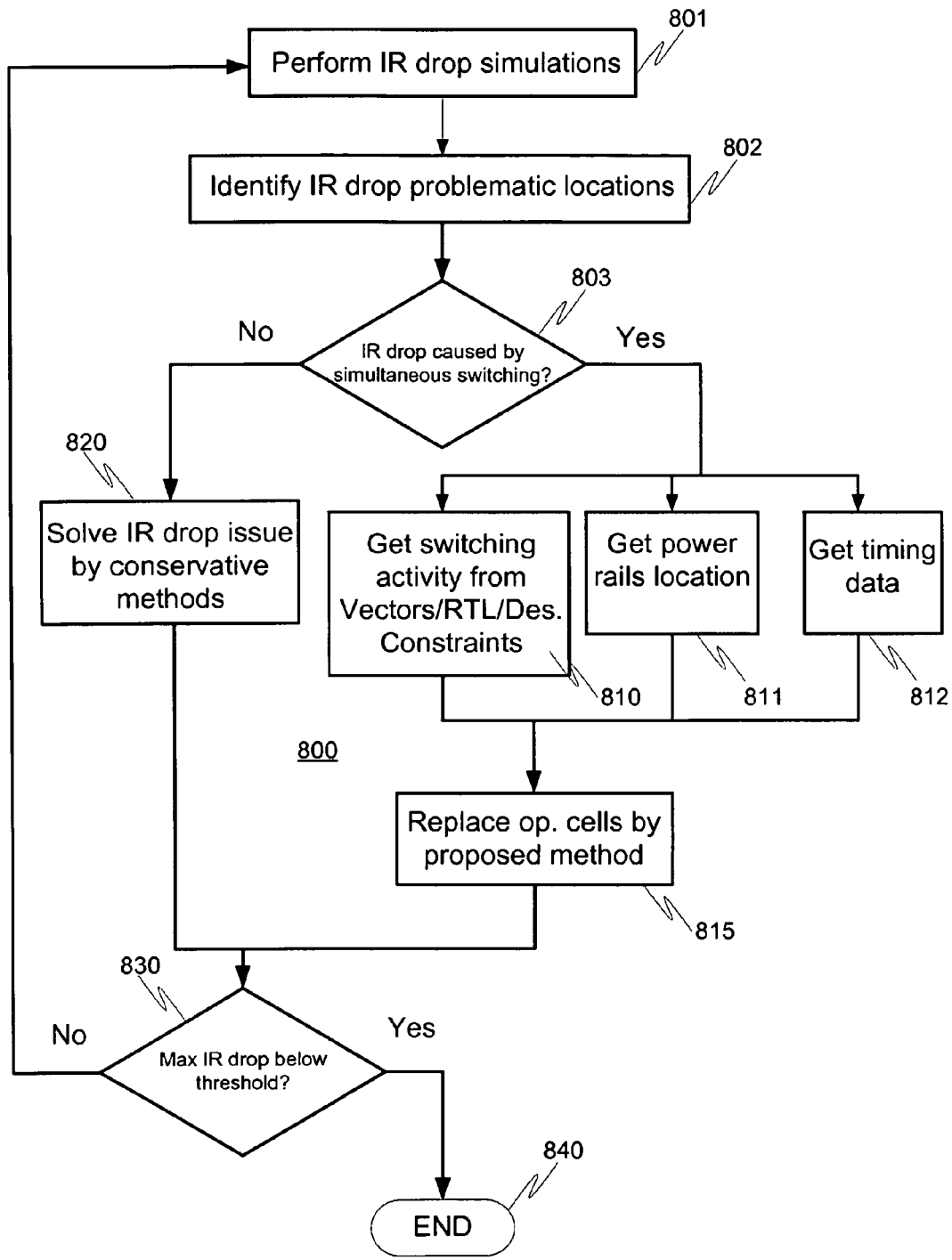
FIG. 8 shows a high level flow diagram of an example method for re-placing operational cells within a semiconductor physical layout to take into account localised IR drop, according to an example of the invention

FIG. 8 shows a high level flow diagram of an example method for re-placing operational cells 210 (compared to the initial placement provided by the method of FIG. 5) within a semiconductor device physical layout, to take into account localised IR drop. This process may occur after the initial placement process (either carried out as exemplified in FIG. 5, or by standard non-IR drop aware automated design layout placement) has been carried out, or may occur as a further iteration of an overall placement process that already uses an estimated IR drop assessment to carry out initial placement.

The re-placement process 800 starts by performing IR drop simulations 801, using test vectors, for each operational cell 210 in the initial layout, so that operational cells 210 in the initial layout that have a (simulated) high IR drop, so called "problematic" locations of operational cells, can be identified 802.

The operational cells 210 that have a high simulated IR drop are then assessed over whether the high IR drop is being caused by simultaneous switching 803 or not. Where the high IR drop is being caused by simultaneous switching, the method then assesses a combination of switching activity from vectors/RTL code/Design constraints 810, location of (distributed) power switches 811 and timing (e.g. skew) data for the operation of the semiconductor 812 to create a set of re-placement instructions/suggestions, which are then used to re-place 815 the operational cells 210.

High IR drop is not only caused by simultaneous switching, but may also be caused by other issues, such as global weak power grid, out-of-module power consumption level, and the like. Where any of these issues are the cause of an identified high IR drop for an operational cell, the high IR drop issue may alternatively be resolved using conservative/conventional methods 820, such as by using power grid enforcement, the addition or re-placement of power pins, and the like.

Once a re-placement layout has been derived, the IR drops likely to be experienced by each operational cell 210 now that it is in a new location is simulated, so that the resultant IR drop may be assessed against the same maximum IR drop threshold (either individually, by switching groups or globally) 830, or against a refined, tighter maximum IR drop threshold value if desired (for example, in the case of using multiple iterations of the method). The method then iterates until all the operational cells 210 are simulated to have an IR drop below the predetermined maximum IR drop threshold, i.e. the desired level of maximum IR drop has been reached 840 or bettered.

FIG. 9 shows how the described method may be placed into the overall semiconductor design flow of FIG. 1. In the example shown, the (re)placement optimisation of FIG. 8 is carried out after the standard initial placement 102. However, the (re)placement optimisation of FIG. 8 may also be carried out after the clock tree stage 103 or routing stage 104, shown by the dotted arrows marked 800. If the initial placement example of FIG. 5 is used, it may occur instead of the standard initial placement, as shown by the dotted arrow labelled 500.

The IR drops experienced by each operational cell 210 during use of the semiconductor device will vary with time and particular data loading of the semiconductor device. Therefore the described process may be operable to determine time varying IR drops for each operational cell 210, or a worst case scenario (i.e. the highest simulated IR drop to be experienced by an operational cell).

Thus a power-aware and inter-dependent timing/switching aware placement method for operational cells 210 in a semiconductor device can be obtained when designing semiconductor devices, which reduces localised IR drop problems resultant from previous placement methods. Accordingly, semiconductor devices having reduced IR drop problems as well.

A combination of existing data from different Back End synthesis and IR drop analysis tools may be used as inputs into a placement algorithm operable to carry out the described method of (initially/re-)placing a plurality of operational cells 210 within a semiconductor physical layout.

Examples may provide a method of placing a plurality of operational cells 210 of a semiconductor device within a semiconductor layout, comprising determining an estimated IR drop value for each of the plurality of operational cells 210 when the semiconductor device will be in use, identifying operational cells 210 having an estimated IR drop value above a predetermined threshold and re-placing identified operational cells within the semiconductor layout to reduce IR drop.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

Figure 10:
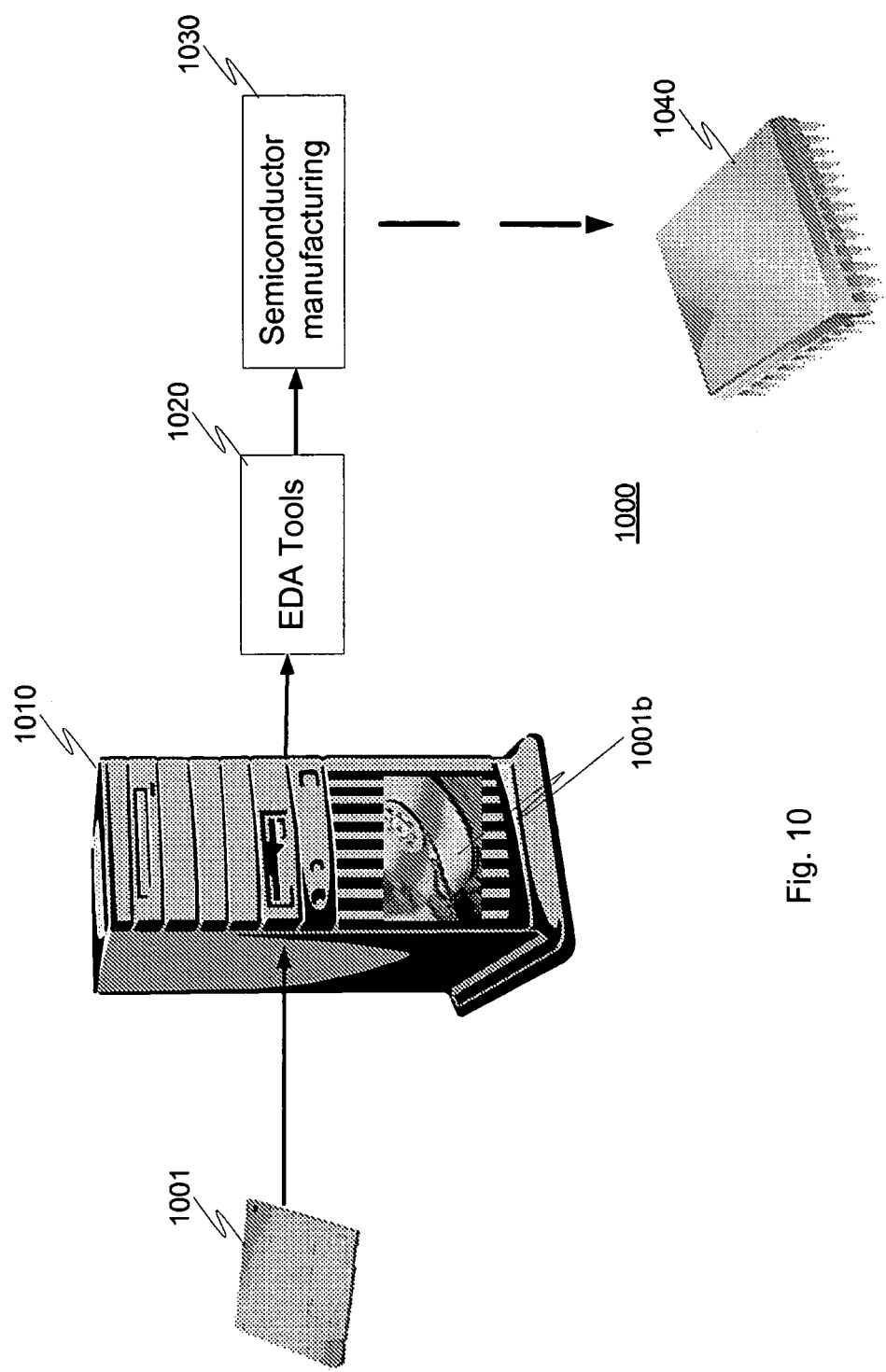
FIG. 10 shows a system for designing and manufacturing semiconductor devices, according to an example of the invention.

FIG. 10 shows an example implementation of the described method, as part of a EDA design system 1000, where the method is embodied as a computer readable medium (e.g. the method comprises instructions stored on a computer readable disk 1001, to be read by a computer system 1010, or on a hard drive 1001b within the computer system 1010). The computer system may be, for example, an EDA design workstation 1010 to execute code to provide the EDA tools incorporating the method that feeds into the semiconductor manufacturing process 900 (e.g. according to FIG. 9), to form a final optimised semiconductor device 1040.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include, at least one processing unit, associated memory and a number of input/output (I/O) devices. When executing the computer program, the computer system processes information according to the computer program and produces resultant output information via I/O devices. The computer system may be a semiconductor design work station or the like.

In the foregoing specification, the invention has been described with reference to specific examples of embodiments of the invention. It will, however, be evident that various modifications and changes may be made therein without departing from the broader spirit and scope of the invention as set forth in the appended claims. For example, whilst the above has been described in terms of synchronous circuits, using RTL as the design language, the invention may also be applied to non-synchronous circuits using other design languages as well, such as domino logic for example.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method comprising:
    initially placing a plurality of operational cells of a semiconductor device within a semiconductor physical layout;
    determining timing data for each of the plurality of operational cells;
    determining, by a computer, switching activity from a logic description or design constraints for each of the plurality of operational cells;
    determining power grid switch locations relative to each of the plurality of operational cells;
    deriving a cost function based upon the determined timing data, switching activity and power grid switch locations;
    initially, by the computer, placing the plurality of operational cells at positions which are dependent on the derived cost function;
    determining an estimated power loss (IR drop) value for each of the plurality of operational cells when the semiconductor device will be in use, wherein the estimated IR drop is based on a number of the plurality of operational cells that switch simultaneously;
    identifying operational cells having an estimated IR drop value above a predetermined threshold; and
    re-placing identified operational cells within the semiconductor layout to reduce IR drop.

2. The method of claim 1, wherein determining an estimated IR drop value for each of the plurality of operational cells when the semiconductor device will be in use, comprises determining a worst-case maximum IR drop value.

3. The method of claim 1, further comprising determining if the identified operational cells having an estimated IR drop value above a predetermined threshold are on a timing-critical path, wherein:
    if the identified operational cells are on a timing-critical path, the identified operational cells are re-placed within the semiconductor physical layout to reduce IR drop; or
    if the identified operational cells are not on a timing-critical path, the identified operational cells are left in their existing placement.

4. The method of claim 3, wherein identifying operational cells having an estimated IR drop value above a predetermined threshold further comprises:
    identifying the estimated IR drop value dependent upon switching activity of the operational cells during use.

5. The method of claim 3, wherein identifying operational cells having an estimated IR drop value above a predetermined threshold further comprises:
    identifying operational cells having an estimated IR drop value above a predetermined threshold located in the semiconductor layout in one or more switching islands, wherein a switching island comprises a group of operational cells switching at substantially the same time and located adjacent one another.

6. The method of claim 5, wherein a switching island is further defined by a proximity of the respective operational cells to the power grid switch locations.

7. The method of claim 1, further comprising determining operational cells having the same switching group and dependent thereon, distances between operational cells of the same group.

8. The method of claim 1, further comprising determining a re-placement based upon any one or more of:
    switching activity of the identified operational cells from vectors;
    power rail location information; and
    timing data.

9. The method of claim 8, wherein re-placement of the identified operational cells comprises:
    swapping a location of an identified operational cell having an estimated IR drop value above a predetermined threshold with a location of another operational cell that is not in a same switching group; or
    swapping a location of an identified operational cell having an estimated IR drop value above a predetermined threshold with a location of another operational cell that is part of a less-critical timing path.

10. The method of claim 9, further comprising, after re-placement of identified operational cells:
    re-determining an estimated IR drop value for each of the plurality of operational cells during use of the semiconductor device; and
    if the re-determined maximum IR drop for at least one operational cell is above a predetermined threshold, carrying out another re-placement.

11. The method of claim 1, wherein the method of placing operational cells comprises a method of optimising an initial placement of operational cells in a semiconductor physical layout.

12. A method of re-placing a plurality of operational cells of a semiconductor device within a semiconductor physical layout, comprising:
    determining, by a computer, a simulated power loss (IR drop) value for each of the plurality of operational cells when the semiconductor device will be in use;
    identifying, by the computer, operational cells having a simulated IR drop value above a predetermined threshold;
    determining whether the identified operational cells have a high estimated IR due to simultaneous switching, and if so, the method further comprising:
    determining timing data for each of the plurality of operational cells;
    determining switching activity from a logic description or design constraints for each of the plurality of operational cells;
    determining power grid switch locations relative to each of the plurality of operational cells;
    deriving a cost function based upon the determined timing data, switching activity and power grid switch locations; and re-placing identified operational cells within the semiconductor layout to reduce IR drop;
wherein the method further comprises:
determining a simulated IR drop value for each of the plurality of re-placed operational cells when the semiconductor device will be in use; and
determining whether each re-placed operational cell IR drop value is below a predetermined maximum IR drop threshold.

13. A method of manufacturing a semiconductor device, comprising carrying out the method of claim 12, and manufacturing the semiconductor device from the semiconductor physical layout.

14. The method of claim 12, further comprising determining operational cells having the same switching group and dependent thereon, distances between operational cells of the same group.

15. A method of initially placing a plurality of operational cells of a semiconductor device within a semiconductor physical layout, comprising:
determining timing data for each of the plurality of operational cells;
determining, by a computer, switching activity a logic description or design constraints for each of the plurality of operational cells;
determining power grid switch locations relative to each of the plurality of operational cells;
deriving a cost function based upon the determined timing data, switching activity and power grid switch locations;
initially, by the computer, placing the plurality of operational cells at positions which are dependent on the derived cost function; and
swapping a location of an identified operational cell having an estimated power loss (IR drop) value above a predetermined threshold with a location of another operational cell that is not in a same switching group; or
swapping a location of an identified operational cell having an estimated IR drop value above a predetermined threshold with a location of another operational cell that is part of a less-critical timing path.

16. The method of claim 15, wherein the method of placing operational cells comprises a method of optimising an initial placement of operational cells in a semiconductor physical layout.

17. The method of claim 15, further comprising:
re-determining an estimated IR drop value for each of the plurality of operational cells during use of the semiconductor device; and
if the re-determined maximum IR drop for at least one operational cell is above a predetermined threshold, carrying out another re-placement.

18. The method of claim 15, further comprising:
determining an estimated IR drop value for each of the plurality of operational cells when the semiconductor device will be in use, wherein the estimated IR drop is based on a number of the plurality of operational cells that switch simultaneously;
identifying operational cells having an estimated IR drop value above a predetermined threshold;
re-placing identified operational cells within the semiconductor layout to reduce IR drop.

19. A method of manufacturing a semiconductor device, comprising carrying out the method of claim 15, and manufacturing the semiconductor device from the semiconductor physical layout.

* * * * *